W. F. BERRY.
WHEELBARROW.
APPLICATION FILED JAN. 3, 1921.

1,407,690.

Patented Feb. 28, 1922.

Inventor
Wilbur F. Berry.

UNITED STATES PATENT OFFICE.

WILBUR F. BERRY, OF CHICAGO, ILLINOIS.

WHEELBARROW.

1,407,690. Specification of Letters Patent. Patented Feb. 28, 1922.

Application filed January 3, 1921. Serial No. 434,540.

*To all whom it may concern:*

Be it known that I, WILBUR F. BERRY, a citizen of the United States, residing at Chicago, in the county of Cook and State of Illinois, have invented new and useful Improvements in Wheelbarrows, of which the following is a specification.

This invention relates to wheelbarrows which are provided with certain auxiliary wheels to facilitate the operation of propelling the wheelbarrow, and tilting the same to dump its load.

The invention has for its object to provide a novel and improved arrangement of auxiliary wheels for the purpose stated, and to this end it consists in a combination and arrangement of parts to be hereinafter described and claimed.

Figure 1:
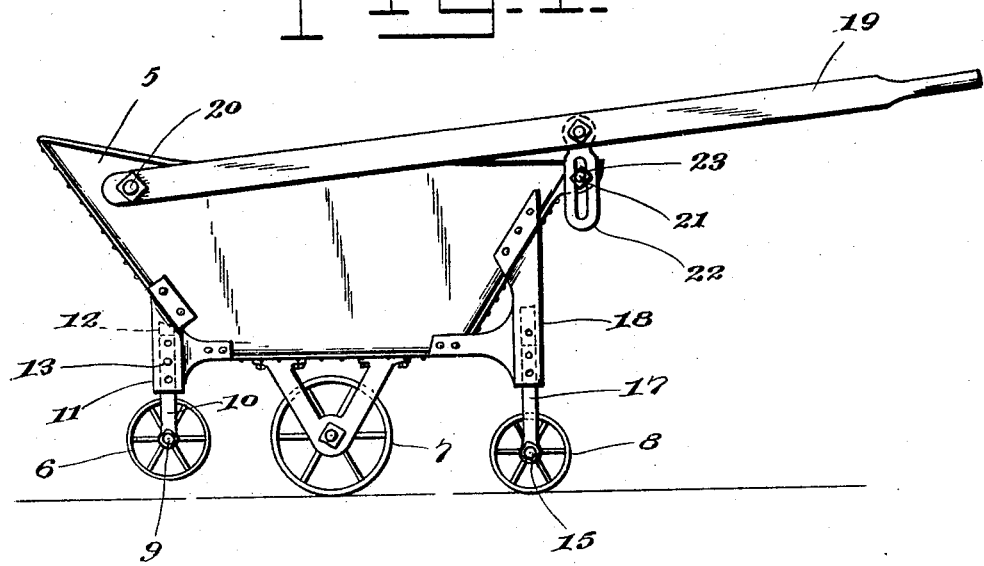
Figure 2:
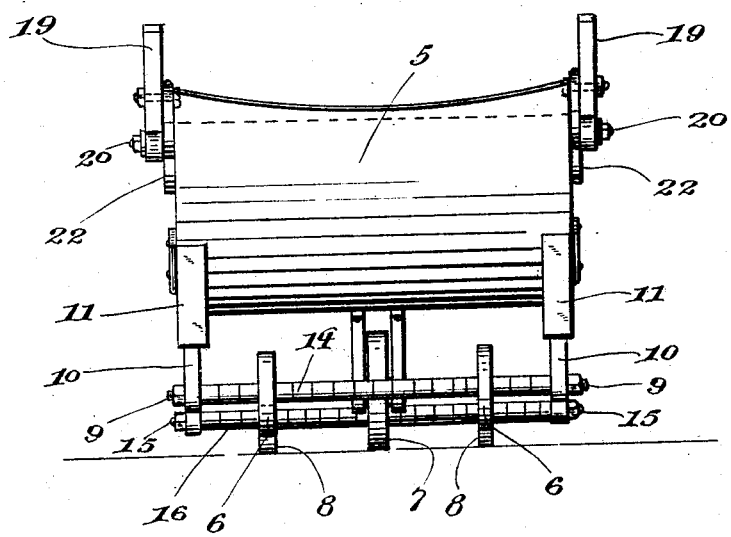

In order that the invention may be better understood, reference is had to the accompanying drawing forming a part of this specification, and in said drawing, Figure 1 is a side elevation of the wheelbarrow and Fig. 2 is a front elevation thereof.

Referring specifically to the drawing, 5 denotes the hopper-shaped body of the wheelbarrow, the same being provided with three sets of wheels, namely, a pair of auxiliary front wheels 6, a single main wheel 7 at the middle and a pair of auxiliary rear wheels 8.

The front wheels 6 run loose on an axle 9 supported at its ends by hangers 10 carried by bracket members 11 on the body 5, said bracket members having vertical sockets 12 in which the upper ends of the bars seat and in which they are held by pins 13, vertical series of holes for the pins being provided to permit vertical adjustment as will be understood.

On the axle 9 are positioned washers or rings 14 for spacing the wheel 6 and for maintaining their proper position on the axle. These washers are located between the wheels and also between the hangers 10 and the wheels. It will therefore be seen that the wheels can be set closer together by removing some of the washers between the wheels and placing the same outside the wheels between the same and the hangers, and by a reversal of this operation, the wheels can be set farther apart. When the wheelbarrow is to be run on the ground, the wheels will be spread, whereas when the wheelbarrow is being run on planks or other narrow parts, the wheels will be set closer together.

The rear wheels 8 are mounted on an axle 15 provided with adjusting washers or rings 16 arranged and operating in the same manner as the washer 14. The axle 15 is supported by hangers 17 carried by bracket members 18 on the body 5, said hangers being adjustably supported in the same manner as the hangers 10 hereinbefore described.

Handle bars 19 are provided for operating the wheelbarrow, the same being pivoted at their forward ends to the forward portion of the body 5, as shown at 20. The rear portion of the body 5 carries side bolts 21 which pass through slots in links 22 pivoted to the handle bars 19 intermediate the ends thereof. The purpose of this connection is to permit vertical adjustment of the handle bars to short or tall operators, and they are held in adjusted position by nuts 23 screwed on the bolts 21.

The supports of the wheel 6 are adjusted to position said wheel slightly higher than the wheel 7 and 8, and when the wheelbarrow is being propelled it runs on the wheels 7 and 8. The front wheels 6 are intended to sustain the weight of the load when the wheelbarrow is being tipped forwardly, thereby relieving the operator of the load, and by providing two of such wheels, the wheelbarrow is effectually prevented from tilting sidewise to spill its load.

The rear wheels 8, in conjunction with the middle wheel 7, support the load while the wheelbarrow is being propelled, and hence the operator is not required to lift the load, the handle bars 19 being used only for propelling and guiding the wheelbarrow, and for tipping it to dump the contents of the body 5.

I claim:

1. A wheelbarrow comprising a body, a main wheel supporting the body, a pair of laterally spaced auxiliary supporting wheels for the body, an axle carrying the auxiliary wheels, and means for varying the spacing of the auxiliary wheels, on their axle.

2. A wheelbarrow comprising a body, a main wheel supporting the body, a pair of laterally spaced auxiliary supporting wheels for the body, an axle carrying said auxiliary wheels, hangers supporting the axle at its ends, and spacing elements on the axle between the wheels thereon, and between the wheels and the hangers, said elements being adjustable to vary the spacing of the wheels.

3. A wheelbarrow comprising a body, a main wheel supporting the body, a pair of laterally spaced auxiliary supporting wheels for the body, an axle carrying the auxiliary wheels, and a vertically adjustable support for the axle of the auxiliary wheels, and means for varying the spacing of the auxiliary wheels on their axle.

4. A wheelbarrow comprising a body, a main wheel supporting the body, a pair of laterally spaced auxiliary wheels in front of and a pair to the rear of the main wheel, axles carrying the pairs of auxiliary wheels, a vertically adjustable support for the axles of the auxiliary wheels, and means for varying the spacing of the auxiliary wheels on their axles.

In testimony whereof I affix my signature.

WILBUR F. BERRY.